US012762167B1

(12) United States Patent
Strasman et al.

(10) Patent No.: US 12,762,167 B1
(45) Date of Patent: Oct. 13, 2026

(54) BUFFERING AI RESPONSES FOR REOCCURRING QUERIES

(71) Applicant: VAST DATA LTD., Tel Aviv (IL)

(72) Inventors: Nery Strasman, Tel Aviv (IL); Asaf Levy, Tel Aviv (IL)

(73) Assignee: Vast Data LTD., Tel Aviv (IL)

( * ) Notice: Subject to any disclaimer, the term of this patent is extended or adjusted under 35 U.S.C. 154(b) by 0 days.

(21) Appl. No.: 19/321,103

(22) Filed: Sep. 5, 2025

Related U.S. Application Data

(63) Continuation-in-part of application No. 19/286,291, filed on Jul. 31, 2025.

(51) Int. Cl.
*G06F 16/33* (2025.01)
*G06F 16/3349* (2025.01)
*G06F 40/30* (2020.01)

(52) U.S. Cl.
CPC .......... *G06F 16/3349* (2019.01); *G06F 40/30* (2020.01)

(58) Field of Classification Search
CPC ............................. G06F 16/3349; G06F 40/30
See application file for complete search history.

(56) References Cited

U.S. PATENT DOCUMENTS

| | | | | |
|---|---|---|---|---|
| 12,645,361 | B1 * | 6/2026 | Khazon | G06F 3/0611 |
| 2018/0072327 | A1 * | 3/2018 | Seppelt | B60K 35/10 |
| 2024/0412720 | A1 * | 12/2024 | Vasylyev | G06F 16/90332 |
| 2026/0099533 | A1 * | 4/2026 | Verrier | G06F 16/3334 |

* cited by examiner

*Primary Examiner* — Merilyn P Nguyen
(74) *Attorney, Agent, or Firm* — Reches Patents

(57) ABSTRACT

The present disclosure provides a method for independent response to a query aimed at an artificial intelligence (AI) entity. The method comprises querying, by a computerized unit, the AI entity with a computerized unit query that is identical to a reoccurring query that received AI entity responses that change over time from the AI entity. The method further comprises receiving, by the computerized unit, an AI entity response to the computerized unit query, and buffering the AI entity response in a buffer of the computerized unit and associating timing information with the buffered AI entity response. The method includes receiving, following the buffering, the reoccurring query from a user, and responding to the reoccurring query.

20 Claims, 4 Drawing Sheets

BUFFERING AI RESPONSES FOR REOCCURRING QUERIES

CROSS-REFERENCE TO RELATED APPLICATIONS

This application is a continuation in part of U.S. patent application Ser. No. 19/286,291 filing date Jul. 31, 2025, which is hereby incorporated by reference in its entirety.

FIELD OF INVENTION

The present disclosure relates to artificial intelligence systems and query processing, and more particularly to buffering responses from AI entities for reoccurring queries that receive AI entity responses over time.

BACKGROUND

Large Language Models (LLMs) and other artificial intelligence (AI) systems have become increasingly prevalent in natural language processing applications. These AI entities process input queries, commonly referred to as prompts, and generate responses that appear human-like in nature. The computational processes involved in generating these responses can be time-consuming, as they typically involve iterative steps within the AI entity architecture.

As AI entities gain widespread adoption, they frequently encounter repeated queries from users. However, the nature of certain queries means that appropriate responses may change over time. For example, queries about dynamic information such as exchange rates, weather forecasts, concert schedules, or other time-sensitive data may warrant different responses even when the query itself remains identical. This presents challenges in balancing response accuracy with system efficiency.

When AI entities experience high demand, particularly for popular queries that are submitted by multiple users within short time periods, response latency can become a concern. Users may experience extended wait times as the system processes multiple instances of similar queries, leading to potential degradation in user experience. The computational overhead associated with repeatedly processing identical or similar queries can strain system resources and reduce overall throughput.

SUMMARY

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

According to an aspect of the present disclosure, a method for independent response to a query aimed at an artificial intelligence (AI) entity is provided. The method includes (a) querying, by a computerized unit, the AI entity with a computerized unit query that is identical to a reoccurring query that received AI entity responses that change over time; (b) receiving, by the computerized unit, an AI entity response to the computerized unit query; (c) buffering the AI entity response in a buffer of the computerized unit and associating timing information with the buffered AI entity response; (d) receiving, following the buffering, the reoccurring query from a user; and (e) responding to the reoccurring query. The responding may include providing the buffered AI entity response and an indication regarding the timing information. When receiving from the user, following the provision of the buffered AI entity response, a request to send the reoccurring query to the AI entity then sending the reoccurring query to the AI entity, receiving an AI entity response to the reoccurring query, sending the AI entity response to the reoccurring query to the user, and replacing the buffered AI entity response with the AI entity response to the reoccurring query to the user.

According to other aspects of the present disclosure, the method may include avoiding caching the AI response. The buffered AI response may be an only instance of the AI response within the computerized unit. The buffer may be solely dedicated for (i) buffering responses of reoccurring queries that receive AI entity responses that change over time, and (ii) providing buffered responses and related timing information to users. The timing information may be indicative of a timing of buffering the buffered AI response. The method may comprise determining, by the computerized unit that a query received by the computerized unit reoccurs and receives AI entity responses that change over time from the AI entity. The AI entity may be a large language model (LLM) entity.

According to another aspect of the present disclosure, a non-transitory computer-readable medium storing instructions that, when executed by a processor, cause the processor to perform a method for independent response to a query aimed at an AI entity is provided. The method includes (a) querying, by a computerized unit, the AI entity with a computerized unit query that is identical to a reoccurring query that received AI entity responses that change over time; (b) receiving, by the computerized unit, an AI entity response to the computerized unit query; (c) buffering the AI entity response in a buffer of the computerized unit and associating timing information with the buffered AI entity response; (d) receiving, following the buffering, the reoccurring query from a user; and (e) responding to the reoccurring query. The responding may include providing the buffered AI entity response and an indication regarding the timing information. When receiving from the user, following the provision of the buffered AI entity response, a request to send the reoccurring query to the AI entity then sending the reoccurring query to the AI entity, receiving an AI entity response to the reoccurring query, sending the AI entity response to the reoccurring query to the user, and replacing the buffered AI entity response with the AI entity response to the reoccurring query to the user.

According to another aspect of the present disclosure, a computerized unit for independent response to a query aimed at an AI entity is provided. The system includes a processor and a memory storing instructions that, when executed by the processor, cause the processor to (a) query, by a computerized unit, the AI entity with a computerized unit query that is identical to a reoccurring query that received AI entity responses that change over time; (b) receive an AI entity response to the computerized unit query; (c) control buffering of the AI entity response in a buffer of the computerized unit and associating timing information with the buffered AI entity response; (d) receive, following the buffering, the reoccurring query from a user; and (e) respond to the reoccurring query. The responding may include providing the buffered AI entity response and an indication regarding the timing information. When receiving from the user, following the provision of the buffered AI entity response, a request to send the reoccurring query to the AI entity then sending the reoccurring query to the AI entity, receiving an AI entity response to the reoccurring query, sending the AI entity response to the reoccurring query to the user, and replacing the buffered AI entity response with the AI entity response to the reoccurring query to the user According to other aspects of the present disclosure, the instructions may cause the processor to avoid caching the AI response. The AI entity may be a large language model (LLM) entity.

The foregoing general description of the illustrative embodiments and the following detailed description thereof are merely exemplary aspects of the teachings of this disclosure and are not restrictive.

BRIEF DESCRIPTION OF FIGURES

Non-limiting and non-exhaustive examples are described with reference to the following figures.

DETAILED DESCRIPTION

Figure 1:
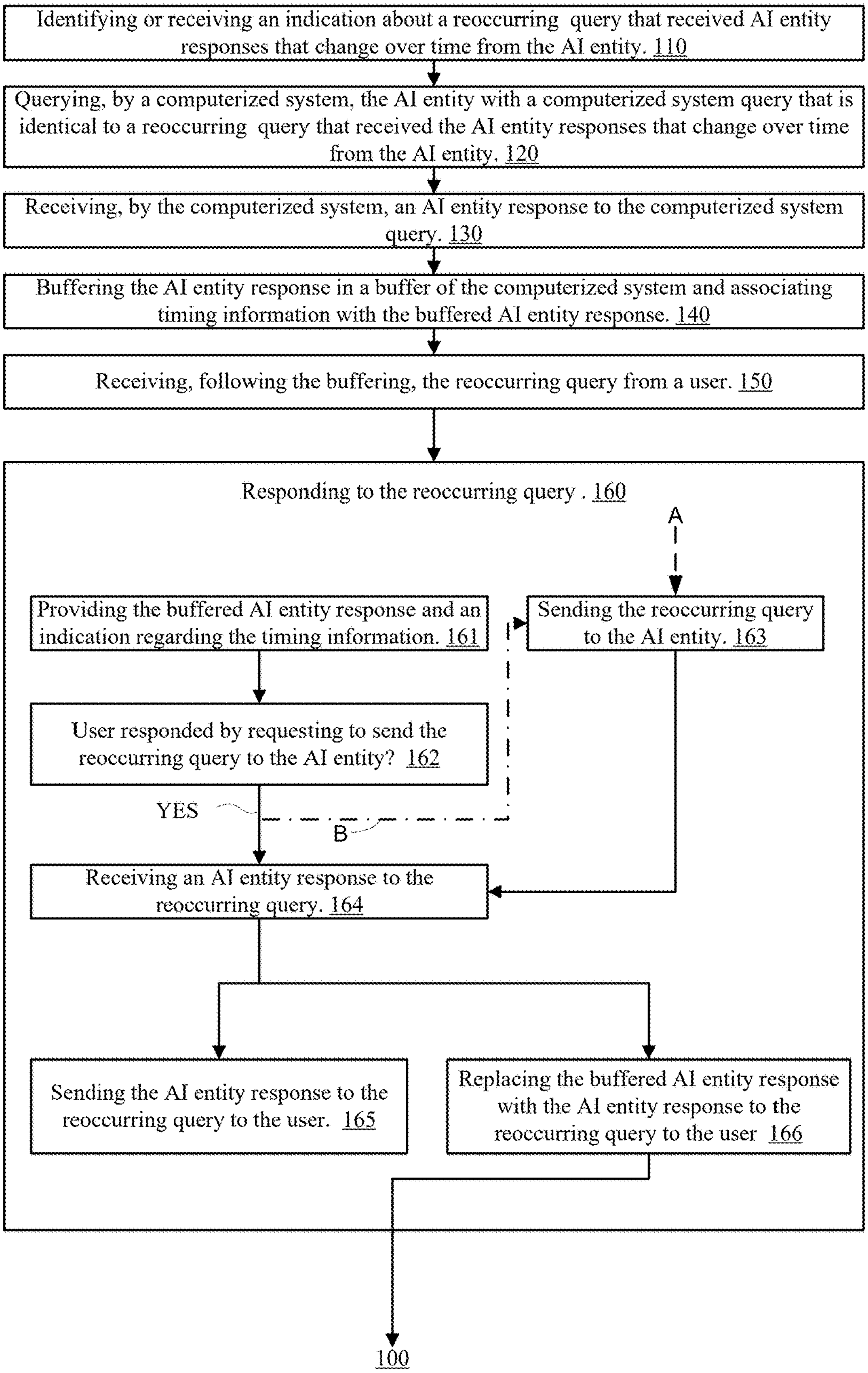
FIG. 1 illustrates a flowchart of a method.

The following description sets forth exemplary aspects of the present disclosure. It should be recognized, however, that such description is not intended as a limitation on the scope of the present disclosure. Rather, the description also encompasses combinations and modifications to those exemplary aspects described herein.

Large Language Models and other artificial intelligence entities have become increasingly prevalent in natural language processing applications, where these systems process input queries and generate human-like text responses. The computational demands of generating responses through these AI entities can be substantial, particularly when the same queries are submitted repeatedly by multiple users. Traditional caching approaches may not be suitable for certain types of queries that receive AI entity responses over time, such as requests for current exchange rates, weather forecasts, or event schedules, where the accuracy of information depends on temporal factors.

The disclosed approach addresses the challenge of managing reoccurring queries that produce time-sensitive or variable responses from AI entities. Rather than relying on conventional caching mechanisms that store static responses, the system implements a buffering strategy that maintains fresh responses while providing immediate availability to users. This buffering approach involves proactively querying the AI entity during periods of lower system activity to obtain updated responses for frequently requested queries that are known to produce changing results.

The buffering system associates timing information with each stored response, enabling users to understand when the buffered response was generated and how current the information may be. This temporal awareness allows users to make informed decisions about whether the buffered response meets their needs or whether they require a more recent response directly from the AI entity. The system provides flexibility by offering users the option to request an updated response when the buffered information may not be sufficiently current for their specific requirements.

In some cases, the buffering mechanism operates differently from traditional caching systems by maintaining responses that may be unique instances within the system and may not exist elsewhere at any given time. The buffered responses are generated specifically for the purpose of providing immediate availability while maintaining awareness of their temporal context. This approach enables the system to balance computational efficiency with response accuracy, reducing wait times for users while preserving the ability to obtain current information when needed.

The system may determine which queries are suitable for this buffering approach by identifying patterns of reoccurring queries that historically receive AI entity responses that change over time from the AI entity. Once such queries are identified, the system can implement periodic or non-periodic querying during idle periods to maintain updated buffered responses. The timing of these proactive queries may be optimized based on system load, expected query frequency, and the typical rate of change for the information being requested.

The method implementation may follow a structured sequence of processing steps that coordinate the identification, buffering, and delivery of responses for queries directed at the AI entity.

Referring to FIG. 1—illustrating method 100—the method may begin with a step 110 that involves identifying or receiving an indication about the reoccurring query that received AI entity responses that change over time from the AI entity.

Step 110 may involve analyzing query patterns submitted by users through the external computer, tracking historical response variations over time, and maintaining records of queries that demonstrate temporal response characteristics. A computerized unit (such as any of the computerized units of FIGS. 2-4) may implement pattern recognition algorithms to detect when queries appear repeatedly but generate different responses due to the time-sensitive nature of the requested information. Step 110 may also involve receiving explicit indications from system administrators or automated monitoring processes that identify specific queries as candidates for proactive buffering based on their frequency of occurrence and response variability patterns.

Following the identification process, the method may proceed to a step 120 that involves querying, by a computerized unit, the AI entity with the computerized unit query that corresponds identically to the reoccurring query that received AI entity responses that change over time from the AI entity. The timing of step 120 may be optimized to occur during periods when the AI entity experiences lower computational loads or idle states, allowing for efficient resource utilization while maintaining system responsiveness for user-initiated queries. The computerized unit query generated during step 120 may contain identical content, structure, and parameters as the original reoccurring query to ensure that the AI entity processes the query using the same algorithms and data sources that would be applied to user-submitted instances of the same query.

The method may continue with a step 130 that involves receiving, by the computerized unit, the AI entity response to the computerized unit query from the AI entity.

Step 130 may involve validating the received AI entity response to ensure data integrity and completeness before proceeding to subsequent processing steps. Step 130 may also involve logging the receipt of the AI entity response for system monitoring and performance tracking purposes, allowing administrators to analyze response times and system efficiency metrics.

With continued reference to FIG. 1, the method may proceed to a step 140 that involves buffering the AI entity response in the buffer of the computerized unit and associating the timing information with the buffered AI entity response. Step 140 may be coordinated by a controller of a computerized unit, which may direct the buffer to store the AI entity response along with temporal indicators that provide context about when the response was received and processed within the system. The timing information generated during step 140 may include timestamps indicating the exact time of response receipt, elapsed time calculations that track how much time has passed since the response was obtained, and other temporal metadata that enables users to assess the currency of the buffered information. The buffer may implement specialized storage mechanisms during step 140 that maintain the association between the AI entity response and the timing information, ensuring that both components remain linked throughout subsequent retrieval and delivery operations. Step 140 may also involve replacing any previously buffered responses for the same reoccurring query, ensuring that the buffer contains the most recently obtained information for each identified query pattern.

The method may continue with a step 150 that involves receiving, following the buffering process, the reoccurring query from a user.

Step 150 may involve query matching algorithms that compare the incoming user query against stored patterns and identifiers associated with buffered responses within the buffer. The intermediate memory/storage unit may assist during step 150 by providing temporary processing space for query analysis and pattern matching operations. Step 150 may also involve user authentication and session management processes that ensure the requesting user has appropriate access permissions to receive responses from the computerized unit. The controller may coordinate the transition from query receipt to response delivery preparation during step 150, setting up the subsequent processing steps that will deliver the buffered information to the requesting user.

Following the query receipt process, the method may proceed to a step 160 that involves responding to the reoccurring query, where the responding process may include multiple sub-steps that provide users with buffered information and options for obtaining updated responses.

Step 160 may begin with a step 161 that involves providing the buffered AI entity response and an indication regarding the timing information to the user. During step 161, the communication circuit may transmit the stored response that combines the previously buffered AI entity response with the associated timing information, allowing the user to understand both the content of the response and the temporal context of when the information was generated. Step 161 may involve formatting the response to clearly present the timing information in a user-friendly manner, such as indicating how much time has passed since the stored response was received from the AI entity or providing timestamp information that enables users to assess whether the buffered information meets their current requirements. The buffer may coordinate with the communication circuit during step 161 to ensure accurate retrieval and delivery of both the response content and associated temporal metadata.

Step 160 may continue with a step 162 that involves determining whether the user has submitted an update request-which is a request to send the reoccurring query to the AI entity for a more current response. Step 162 may function as a decision point within the method flow, where the computerized unit monitors for the update request from the user following the delivery of the buffered response during step 161. The controller may monitor incoming communications during step 162 to detect when users indicate that the buffered information may not meet their specific temporal requirements for accuracy or currency.

Step 162 may involve timeout mechanisms that determine how long the system waits for user feedback before concluding that the buffered response was sufficient for the user's needs. If step 162 determines that no update request has been received within the specified timeframe, the method may conclude the response process, allowing the user to utilize the buffered information that was provided during step 161.

According to an example (denoted B), when step 162 determines that the user has submitted the update request, the method may proceed to a step 163 that involves sending the reoccurring query to the AI entity for fresh processing. The reoccurring query generated during step 163 may correspond identically to the original query content but represents a new request for current information that bypasses the buffered response stored within the buffer. Step 163 may involve prioritizing the user-requested query within the AI entity processing queue to minimize wait times for users who have specifically requested updated information According to another example (denoted A) the computerized unit executed step 163 at the start of step 160—or without waiting to receive the update request. In this case step 163 may precede steps 162.

In any of examples A and B the responding includes sending an AI entity response generated after the providing of the buffered entity response, to the reoccurring query to the user.

The method may continue with a step 164 that involves receiving the AI entity response to the reoccurring query from the AI entity. The AI entity response is the most updated AI entity response. The updated AI entity response reflects the most current state of the requested information available from the AI entity.

Step 164 may involve validating the received updated AI entity response to ensure data integrity and completeness before proceeding to user delivery and buffer update operations.

Step 164 may also involve logging the receipt of the fresh response for system monitoring purposes, allowing administrators to track the frequency of user-requested updates and system performance metrics related to real-time query processing.

Following the receipt of the fresh response, the method may proceed to a step 165 that involves sending the newest AI entity response (to the reoccurring query) to the user through the external computer.

The communication circuit may transmit the most updated AI entity response to satisfy the user's request for more current information than what was available in the buffered response.

During step 165, the computerized unit may format the most updated AI entity response to clearly indicate that the information represents the most recent data available from the AI entity, distinguishing the most updated AI entity response from the previously buffered information.

Step 165 may involve session management processes that ensure the most updated AI entity response is delivered to the correct user who submitted the update request. The controller may coordinate the delivery process during step 165 while simultaneously preparing for the buffer update operations that will store the fresh response for future user queries.

The method may conclude with a step 166 that involves replacing the buffered AI entity response with the most updated AI entity response (which is the AI entity response to the most recently sent reoccurring query) within the buffer.

Step 166 may involve atomic update operations that ensure system consistency and prevent data conflicts during the transition between the old and new buffered responses.

Step 166 may also involve cleanup operations that remove the previous buffered response and associated timing information, ensuring that the buffer maintains current information for subsequent users who submit the same reoccurring query in the future.

The buffer within the computerized unit may implement specialized storage mechanisms that distinguish the buffering approach from conventional caching systems used in traditional computing environments. The buffer may be dedicated to handling responses for reoccurring queries that receive AI entity responses that change over time from the AI entity, providing a focused storage solution that addresses the temporal nature of AI-generated information. In some cases, the buffer may maintain responses that represent unique instances within the computerized unit, where the buffered AI response may be an only instance of the AI response within the computerized unit at any given time. This characteristic differentiates the buffering approach from distributed caching systems that typically maintain multiple copies of cached data across different storage locations or system components.

The dedicated nature of the buffer may enable specialized functionality that addresses the temporal characteristics of AI-generated responses while maintaining user transparency about information currency. The buffer may be dedicated for buffering responses of reoccurring queries that receive AI entity responses that change over time from the AI entity, and for providing buffered responses and related timing information to users. This dual-purpose design may allow the buffer to serve both storage and delivery functions while maintaining awareness of the temporal context associated with each stored response. In some cases, the buffer may implement storage algorithms that prioritize temporal metadata alongside response content, ensuring that timing information remains accessible and accurate throughout the storage and retrieval process.

The timing information associated with buffered responses may provide users with transparency about the currency and age of stored information, enabling informed decision-making about whether buffered responses meet specific temporal requirements. The timing information may be indicative of a timing of buffering the buffered AI response, providing users with precise temporal context about when the response was received and stored within the system. In some cases, the timing information may include multiple temporal indicators, such as timestamps indicating when the response was received from the AI entity, elapsed time calculations that show how much time has passed since the response was generated, and temporal metadata that tracks the frequency of response updates for specific query patterns. The association between timing information and buffered responses may be maintained through data structures that link temporal metadata with response content, ensuring that users receive both the requested information and the temporal context needed to assess the currency of the provided data.

The buffering approach may avoid traditional caching mechanisms that store static copies of data for extended periods without regard to temporal relevance or information currency. The system may avoid caching the AI response in conventional cache storage systems that typically maintain data until explicitly invalidated or expired through predetermined timeout mechanisms. In some cases, the avoidance of traditional caching may involve implementing storage policies that prevent the creation of persistent copies of AI responses outside the dedicated response buffer, ensuring that buffered responses remain under active management with associated timing information. The distinction between buffering and caching may involve different data lifecycle management approaches, where buffered responses may be actively refreshed based on temporal considerations and user interaction patterns, while cached data typically remains static until cache invalidation events occur.

The buffer may implement storage management policies that maintain the temporal relevance of stored responses while preventing the accumulation of outdated information that could mislead users about current conditions. In some cases, the buffer may maintain storage capacity limits that prevent the accumulation of multiple versions of responses for the same reoccurring query, ensuring that storage resources remain focused on maintaining current information rather than historical response archives. The buffer management approach may involve replacement policies that update stored responses when newer information becomes available, maintaining the principle that the buffered AI response represents an only instance of the AI response within the computerized unit. These storage management policies may coordinate with timing information tracking to ensure that response replacement operations update both the content and temporal metadata associated with each buffered query pattern.

The specialized characteristics of the buffer may enable the system to balance computational efficiency with information accuracy while maintaining user awareness of temporal context. The buffer may provide immediate response delivery capabilities that reduce wait times for users while preserving transparency about when the provided information was generated and how current the data may be relative to real-time conditions. In some cases, the buffer may implement access patterns that prioritize the delivery of timing information alongside response content, ensuring that users receive both the requested information and the temporal context needed to make informed decisions about information currency. The integration of timing information with buffered responses may involve data formatting approaches that present temporal metadata in user-friendly formats, such as elapsed time indicators or timestamp displays that clearly communicate the age and currency of the provided information to requesting users.

The artificial intelligence entity that processes queries and generates responses within the system may encompass various types of AI implementations, each offering different capabilities and architectural approaches for natural language processing and response generation. Large Language Model (LLM) entities represent one category of AI implementation that may be utilized within the system, where LLM entities typically employ transformer-based architectures trained on extensive text datasets to understand and generate human-like text responses. LLM entities may process input queries by analyzing linguistic patterns, contextual relationships, and semantic meanings to produce responses that appear conversational and contextually appropriate. The computational processes within LLM entities may involve multiple layers of neural network processing, attention mechanisms, and probabilistic text generation algorithms that work together to interpret user queries and formulate coherent responses.

The system architecture may accommodate LLM entities through standardized communication interfaces that enable the computerized units to submit queries and receive responses regardless of the specific LLM implementation being utilized. Different LLM entities may vary in their model sizes, training datasets, processing capabilities, and response generation approaches, yet the buffering system may maintain consistent functionality across these variations by focusing on the input-output characteristics rather than the internal processing mechanisms of the LLM entity. The response buffering approach may apply equally to various LLM implementations, whether the LLM entity utilizes generative pre-trained transformer models, bidirectional encoder representations, or other transformer-based architectures that process natural language queries and generate text-based responses.

Beyond LLM implementations, the AI entity may encompass alternative artificial intelligence systems that differ from large language model architectures while maintaining the capability to process queries and generate responses suitable for the buffering approach. Expert systems may serve as AI entities within the system, where expert systems utilize rule-based reasoning, knowledge bases, and inference engines to process queries and generate responses based on domain-specific expertise and logical reasoning processes. Expert systems may differ from LLM entities in their approach to query processing, utilizing structured knowledge representations, decision trees, and rule-based logic rather than statistical language modeling and neural network processing. The buffering system may accommodate expert systems by treating the rule-based responses as AI entity responses that may change over time due to updates in knowledge bases, rule modifications, or changes in underlying data sources that inform the expert system's reasoning processes.

Neural network architectures that differ from transformer-based LLM implementations may also function as AI entities within the system, including recurrent neural networks, convolutional neural networks adapted for text processing, and hybrid architectures that combine multiple neural network approaches. These alternative neural network implementations may process queries through different computational pathways than LLM entities, utilizing recurrent processing for sequential text analysis, convolutional operations for pattern recognition in textual data, or ensemble methods that combine multiple neural network outputs to generate final responses. The buffering approach may accommodate these diverse neural network architectures by maintaining focus on the temporal characteristics of the generated responses rather than the specific computational methods used to produce the responses.

Machine learning systems that incorporate reinforcement learning, supervised learning, or unsupervised learning approaches may serve as AI entities within the system, where these systems may process queries and generate responses based on learned patterns, trained models, or adaptive algorithms that evolve over time. Reinforcement learning systems may generate responses that change based on feedback mechanisms, reward functions, and policy updates that modify the system's behavior in response to user interactions and environmental conditions. Supervised learning systems may produce responses that vary as training datasets are updated, model parameters are refined, or new labeled examples are incorporated into the learning process. The buffering system may accommodate these machine learning approaches by recognizing that the responses generated by learning-based AI entities may change over time due to model updates, training data modifications, or algorithmic improvements that affect response generation patterns.

Hybrid AI entities that combine multiple artificial intelligence approaches may function as AI entities within the system, where hybrid systems may integrate symbolic reasoning with neural network processing, combine rule-based systems with machine learning components, or utilize ensemble methods that aggregate outputs from multiple AI subsystems. Hybrid AI entities may generate responses through multi-stage processing pipelines that involve different AI techniques at various stages of query analysis and response generation. The responses from hybrid AI entity may change over time as individual components within the hybrid architecture are updated, modified, or replaced, leading to variations in response patterns that make these systems suitable candidates for the buffering approach. The system may accommodate hybrid AI entities by treating the integrated output as the AI entity response while maintaining the same buffering functionality regardless of the internal complexity or architectural diversity within the hybrid system.

The flexibility of the system to accommodate diverse AI entity implementations may enable deployment across various application domains and use cases where different types of artificial intelligence systems may be more appropriate for specific query types or response requirements. Domain-specific AI entities may be optimized for particular fields such as financial analysis, medical diagnosis, legal research, or technical support, where specialized AI implementations may provide more accurate or relevant responses than general-purpose LLM entities. The buffering approach may apply consistently across these domain-specific AI entities, recognizing that specialized responses may change over time due to updates in domain knowledge, regulatory changes, or evolving best practices within specific fields. The system may maintain the same buffering functionality while accommodating the unique characteristics and response patterns of different AI entity implementations, ensuring that users receive immediate access to buffered responses regardless of the underlying AI technology being utilized.

The system may be implemented through multiple embodiments that provide different deployment approaches while maintaining consistent functionality for managing reoccurring queries and buffering responses from artificial intelligence entities. A method implementation may provide a procedural approach where the computerized unit executes a sequence of operations to query the AI entity with a computerized unit query that corresponds identically to a reoccurring query that received AI entity responses that change over time from the AI entity. The method implementation may involve receiving an AI entity response to the computerized unit query through communication pathways that connect the computerized unit with the AI entity processing components. The method may continue by buffering the AI entity response in a buffer of the computerized unit and associating timing information with the buffered AI entity response, where the buffering process maintains temporal metadata alongside response content to provide users with currency information about stored responses.

The method implementation may proceed by receiving, following the buffering operations, the reoccurring query from a user through network communication channels that connect remote users with the computerized unit. The method may respond to the reoccurring query through a multi-stage process that begins with providing the buffered AI entity response and an indication regarding the timing information to the requesting user. The response process may include conditional operations that activate when receiving from the user, following the provision of the buffered AI entity response, a request to send the reoccurring query to the AI entity for updated information. When such requests occur, the method may proceed by sending the reoccurring query to the AI entity, receiving an AI entity response to the reoccurring query, sending the AI entity response to the reoccurring query to the user, and replacing the buffered AI entity response with the AI entity response to the reoccurring query to the user. The method implementation may provide flexibility for deployment across different computing environments while maintaining consistent operational characteristics for query processing and response buffering.

Figure 2:
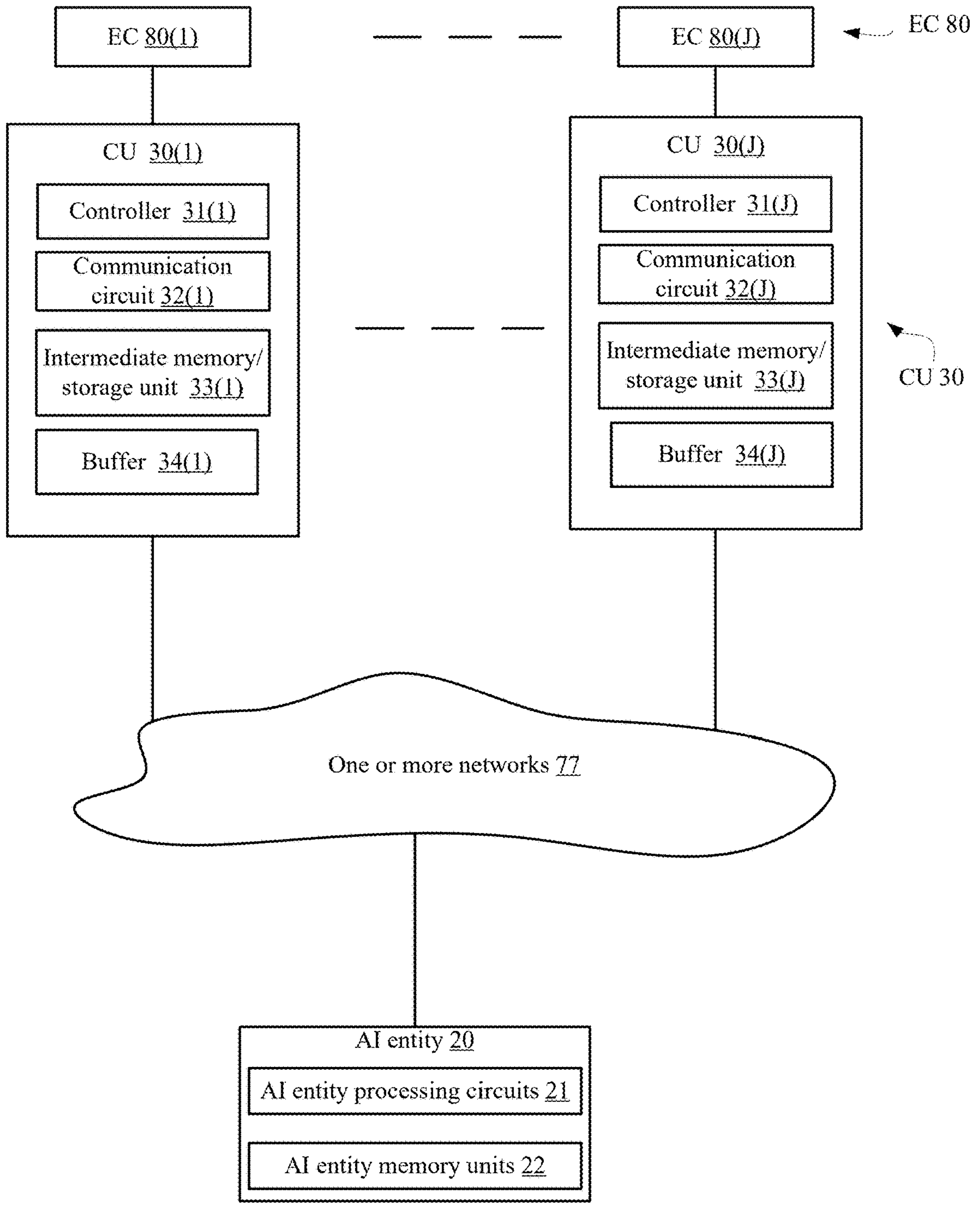
FIG. 2 illustrates a system diagram of computerized units connected to an AI entity, according to aspects of the present disclosure.

Referring to FIG. 2, a system architecture may include multiple computerized units (CU(1)-CU(J) 30(1)-30(J)) collectively denoted 30 that operate in parallel to handle queries from different users associated with external computers (EC(1)-EC(J) 80(1)-80(J)) collectively denoted 80 simultaneously. Any group of external computers (such as EC 80(*j*), j ranged from 1 to J) may be accessed by one or more users). The system may include first CU 30(1) and additional computerized units extending to J'th CU 30(J), where J represents the total number of computerized units in the system. Each computerized unit may be configured to process queries independently while maintaining communication with an AI entity 20 through one or more network systems 77. The parallel operation of multiple computerized units enables the system to distribute processing loads and accommodate multiple users concurrently without creating bottlenecks in query processing.

Each computerized unit may include distinct modular components that provide specialized functionality within the overall system architecture. Computerized unit 30(1) may include a controller 31(1), a communication circuit 32(1), an intermediate memory/storage unit 33(1), and a buffer 34(1). Similarly, computerized unit 30(J) may include a controller 31(J), a communication circuit 32(J), an intermediate memory/storage unit 33(J), and a response buffer 34(J). The modular design of each computerized unit allows for independent operation of the various functional components while maintaining coordinated processing of queries and responses. For each computerized unit the controller may manage the overall operation and coordination of the other components within the computerized unit, while the intermediate memory/storage unit 33 may provide temporary storage capabilities for processing operations.

The AI entity 20 may be implemented using dedicated processing and memory components specifically designed for artificial intelligence tasks. As shown in FIG. 2, the AI entity 20 may include AI entity processing circuits 21 and an AI entity memory units 22 that work together to process queries and generate responses. The AI entity processing circuits 21 may be configured to execute artificial intelligence algorithms and models, while the AI entity memory units 22 may store the data structures, model parameters, and temporary processing information needed for AI operations. The dedicated nature of these components allows the AI entity 20 to handle the computational demands of processing natural language queries and generating contextually appropriate responses.

The communication circuits within the computerized units may provide flexible connectivity options for the overall system architecture. In some cases, a communication circuit may be located outside the computerized unit, allowing for shared communication resources among multiple computerized units. Additionally, there may be multiple communication circuits within the computerized unit to provide redundancy or specialized communication pathways. The communication circuits enable data exchange between the computerized units and other system components through the network systems 77, facilitating the flow of queries and responses throughout the system.

With continued reference to FIG. 2, the system architecture may enable communication with external computers through the one or more networks 77 for receiving queries from remote users. An external computer (EC) 80(1) may connect to the computerized units through the one or more networks 77, allowing users at remote locations to submit queries and receive responses. The one or more networks 77 may provide the communication infrastructure that connects the external computers 80, computerized units 30, and AI entity 20, enabling distributed operation across different physical locations. The buffer within each computerized unit may store processed responses along with associated timing information, allowing for immediate delivery of buffered responses to users connected through the external computers. This distributed architecture allows the system to serve multiple users simultaneously while maintaining efficient communication pathways between all system components.

Figure 3:
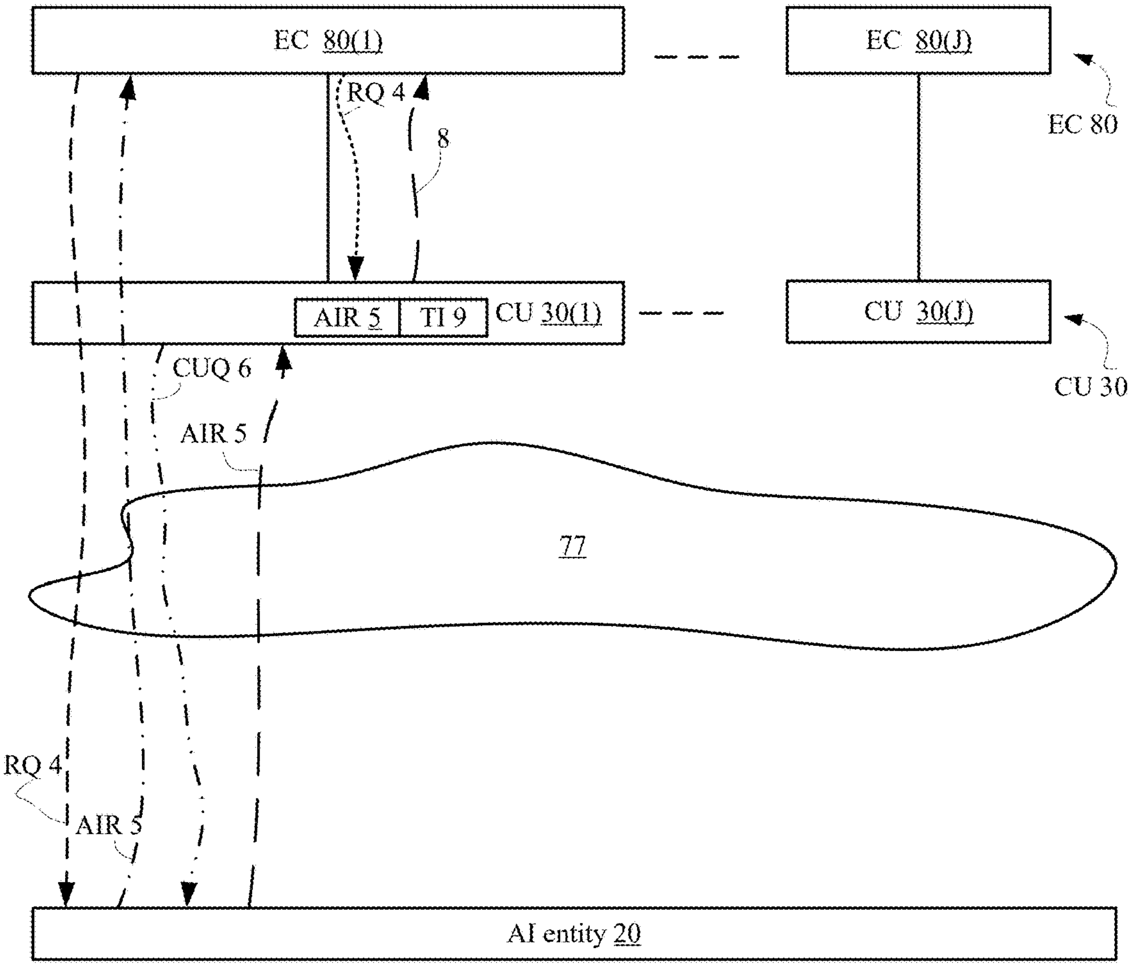
FIG. 3 illustrates a system diagram showing interactions between an external computer, a computerized unit, and the AI entity of FIG. 2, according to aspects of the present disclosure.

In FIG. 3 the following abbreviations are used: RC-reoccurring query (reference number 4), AIR-AI entity response (reference number 5), CUQ—computerized unit query (Reference number 6), TI-timing information (reference number 9).

Figure 4:
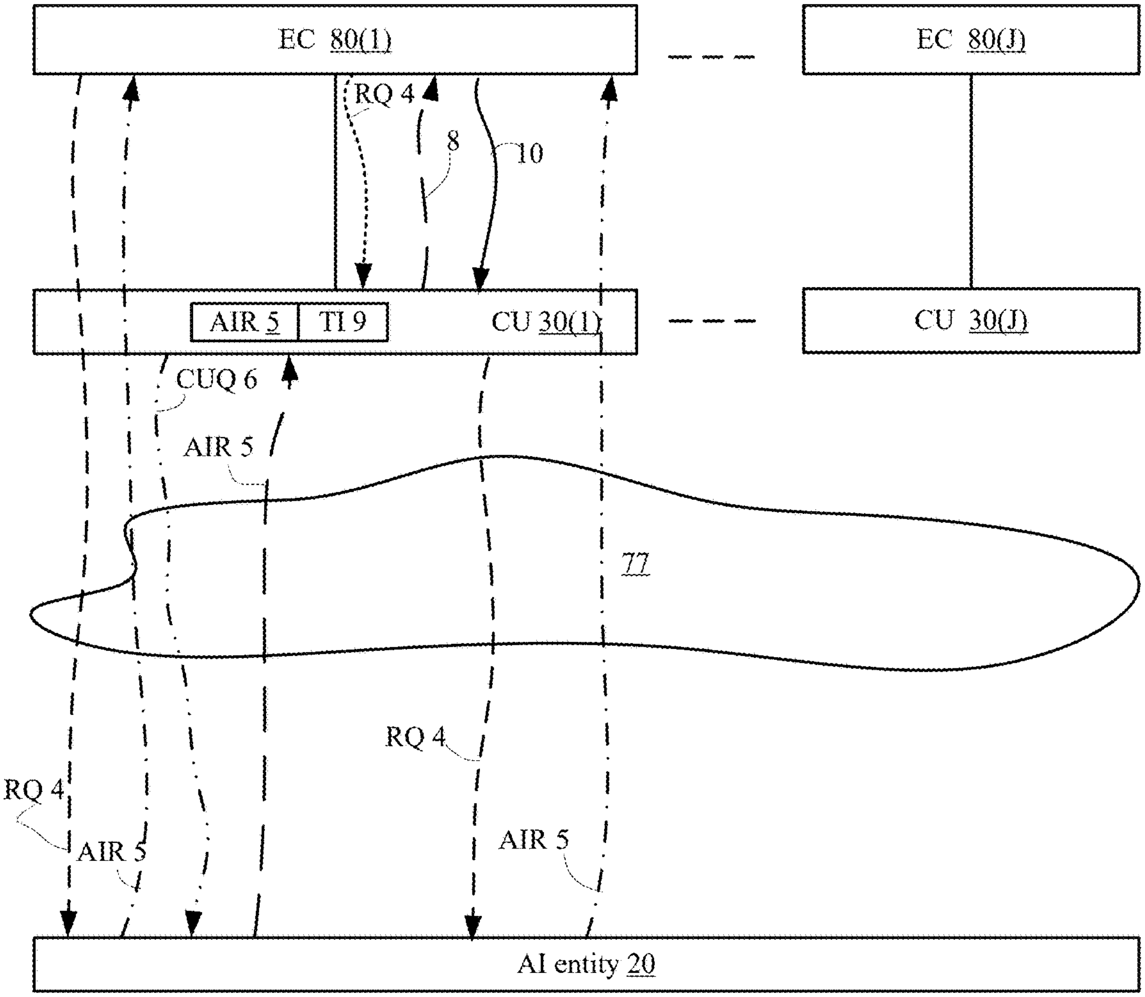
FIG. 4 illustrates a system diagram showing interactions between an external computer, a computerized unit, and the AI entity of FIG. 2, according to aspects of the present disclosure.

In FIG. 3 and FIG. 4 the order (timing) of the transmission of queries and responses may be from left to right—the rightmost reoccurring query is the first event while in FIG. 3 the last event is the provision of response 8. In FIG. 4 the last event is the provision of the AI entity response 5 (following the provision of the update request 10).

Referring to FIG. 3, the system may implement a sequence of operations for processing queries and managing response buffering with temporal tracking capabilities. The computerized unit may receive queries from one or more of the external computers 80 through the one or more networks 77, where these queries may be directed toward the AI entity 20 for processing and response generation. The controller 31 within the computerized unit may coordinate the processing sequence by first determining whether a received query corresponds to a reoccurring query 4 that has previously received AI entity responses that change over time from the AI entity 20. A reoccurring query 4 may represent a type of query that appears multiple times from users but produces different responses over time due to the temporal nature of the requested information, such as queries about current market conditions, weather updates, or real-time data that varies with changing circumstances.

The computerized unit may implement an identification process to recognize when a query received from the external computer 80 represents a reoccurring query 4 that historically receives AI entity responses that change over time from the AI entity 20. This identification process may involve analyzing query patterns, tracking response variations over time, and maintaining records of queries that demonstrate temporal response characteristics. Once the computerized unit identifies a reoccurring query 4, the system may initiate proactive response management by generating a computerized unit query 6 that corresponds identically to the identified reoccurring query 4. The computerized unit query 6 may be transmitted from the computerized unit to the AI entity 20 through the one or more networks 77, allowing the system to obtain updated response information without waiting for user-initiated requests.

The timing of the computerized unit query 6 may be optimized to occur during periods when the AI entity 20 experiences lower computational loads or idle states. During these low-activity periods, the computerized unit may submit the computerized unit query 6 to the AI entity 20, allowing for efficient resource utilization while maintaining system responsiveness for user-initiated queries. The AI entity 20 may then transmit an AI entity response 5 back to the computerized unit through the one or more networks 77, where the AI entity response 5 contains the current information corresponding to the reoccurring query 4.

With continued reference to FIG. 3, the computerized unit may receive the AI entity response 5 from the AI entity 20 and initiate a buffering process that associates temporal information with the received response. The buffer within the computerized unit may store the AI entity response 5 along with timing information 9 that indicates when the response was received and buffered within the system. The timing information 9 may include timestamps, elapsed time calculations, or other temporal indicators that provide users with age information about the stored response, enabling them to understand how much time has passed since the stored response was received from the AI entity 20. The intermediate memory/storage unit 33 may coordinate with the buffer 34 to manage the storage and retrieval of buffered responses while maintaining the associated timing information 9 for each stored response.

The buffering process may differ from conventional caching mechanisms by maintaining responses that represent unique instances within the computerized unit and may not exist elsewhere within the system at any given time. When the computerized unit receives a subsequent instance of the reoccurring query 4 from the one or more of the external computers, the communication circuit 32 may facilitate the immediate delivery of the buffered AI entity response 5 along with the associated timing information 9 to the requesting user. This immediate response capability may reduce wait times for users while providing transparency about the temporal context of the delivered information. The system may also generate a response 8 that incorporates both the buffered content and the timing information 9, allowing users to make informed decisions about whether the buffered response meets their current information needs or whether they require a more recent response directly from the AI entity 20.

Referring to FIG. 4, the system may implement a comprehensive user interaction sequence that demonstrates how the computerized unit responds to user queries by providing buffered responses along with temporal context information. The sequence may begin when an external computer transmits the reoccurring query 4 to the computerized unit that send the reoccurring query to the AI entity 20, which generates and returns an AI entity response 5 that reflects the current state of the requested information. The computerized unit may then deliver this response as an initial response to the external computer, completing the immediate user request while simultaneously initiating the proactive buffering process for future instances of the same query.

Following the delivery of the AI entity response, the computerized unit may execute the proactive querying process by transmitting the computerized unit query 6 to the AI entity 20 during periods of reduced system activity or according to predetermined scheduling parameters. The AI entity 20 may process the computerized unit query 6 to generate the AI entity response 5, which represents an updated version of the information corresponding to the reoccurring query 4. The computerized unit may receive the AI entity response 5 and store this response within the buffer 34 along with associated timing information 9 that indicates when the response was received and buffered. The controller 31 may coordinate this buffering process to ensure that the AI entity response 5 becomes available for immediate delivery to subsequent users who submit the same reoccurring query 4, while the timing information 9 provides temporal context about the age and currency of the buffered information.

When the external computer subsequently transmits another instance of the reoccurring query to the computerized unit, the communication circuit 32 may facilitate the immediate delivery of the buffered information without requiring additional processing time from the AI entity 20. The computerized unit may respond by providing a response 8 that combines the previously buffered AI entity response 5 with the associated timing information 9, allowing the user to understand both the content of the response and the temporal context of when the information was generated. This immediate response delivery mechanism may reduce wait times for users while maintaining transparency about the currency of the provided information. The stored response 8 may include indicators that inform the user how much time has passed since the stored response was received from the AI entity 20, enabling users to assess whether the buffered information meets their current requirements or whether they may need more recent data.

The system may provide users with the option to request more current information when the buffered AI entity response 5 may not meet their specific temporal requirements for accuracy or currency. As shown in FIG. 4, the external computer 80 may transmit an update request 10 to the computerized unit, indicating that the user desires to obtain a more recent response directly from the AI entity 20 rather than relying on the buffered information. The computerized unit may process the update request 10 by generating and transmitting reoccurring query 4 to the AI entity 20, where the reoccurring query 4 corresponds identically to the previously sent reoccurring query content but represents a new request for current information. The AI entity may process the reoccurring query 4 and generate a fresh response that reflects the most current state of the requested information, which the AI entity 20 then transmits back to the computerized unit as an updated AI entity response 5.

With continued reference to FIG. 4, the computerized unit may handle the updated AI entity response 5 through a dual-purpose process that both satisfies the immediate user request and updates the buffered information for future queries. The communication circuit may transmit the updated AI entity response 5 to the external computer 80 as an updated response, providing the user with the most current information available from the AI entity 20.

Simultaneously, the controller may coordinate with the buffer 34 to replace the previously stored AI entity response 5 with the newly received updated AI entity response 5, along with updated timing information 9 that reflects the current timestamp of when the new response was received and buffered. This replacement process may ensure that subsequent users who submit the same reoccurring query 4 will receive the most recently obtained information, while the intermediate memory/storage unit 33 may manage the transition between the old and new buffered responses to maintain system consistency and prevent data conflicts during the update process.

A computer-readable medium implementation may provide a storage-based approach where instructions are encoded on non-transitory storage media for execution by processing components within computing systems. The computer-readable medium may store instructions that, when executed by a processor, cause the processor to perform operations that mirror the method implementation while providing deployment flexibility through portable instruction storage. The instructions stored on the computer-readable medium may cause the processor to query the AI entity with a computerized unit query that corresponds identically to a reoccurring query that received AI entity responses that change over time from the AI entity, enabling the processor to initiate proactive response gathering during periods of reduced system activity. The stored instructions may direct the processor to receive an AI entity response to the computerized unit query through communication interfaces that connect the processing system with AI entity components.

The computer-readable medium implementation may include instructions for implementing method 100 or any of the steps mentioned above.

A computerized unit implementation may provide a hardware-based approach that integrates processing and memory components within a unified architecture designed for managing AI entity interactions and response buffering operations. The computerized unit for independent response to a query aimed at an artificial intelligence entity may include a processor and a memory storing instructions that work together to execute the buffering and response management operations. The processor within the computerized unit may execute instructions stored in the memory to coordinate communication with AI entities, manage response buffering operations, and handle user interactions through network communication channels. The memory component may store both the executable instructions and the data structures needed for buffering operations, including response content, timing information, and system configuration parameters that govern the buffering behavior.

A number of implementations have been described. Nevertheless, it will be understood that various modifications may be made without departing from the spirit and scope of the disclosure. Accordingly, other implementations are within the scope of the following claims.

Artificial intelligence may be used in relation to machines that mimic human intelligence and human cognitive functions like learning and problem solving. There may be three types of artificial intelligence that include artificial super intelligence, artificial narrow intelligence and artificial general intelligence. Machine learning may be a subset of artificial intelligence that allows for optimization. Deep machine learning may be a subset of machine learning that uses larger datasets for training and learns in a different manner than not deep machine learning. Neural networks may be a subset of machine learning and may be used for implementing deep learning.

Any reference to an artificial intelligence model may be applied mutatis mutandis to an artificial intelligence process.

Any reference in the application to any of the terms "artificial intelligence", "machine learning", "deep learning" or "neural network" may be applied mutatis mutandis to any other term of "artificial intelligence", "machine learning", "deep learning" or "neural network". For example any reference to a neural network may be applied mutatis mutandis to artificial intelligence and/or may be applied mutatis mutandis to "machine learning", and/or may be applied mutatis mutandis to "deep learning".

Any reference to "may be" may also refer to "may not be".

In the foregoing detailed description, numerous specific details are set forth to provide a thorough understanding of the one or more embodiments of the disclosure. However, it will be understood by those skilled in the art that the present one or more embodiments of the disclosure may be practiced without these specific details. In other instances, well-known methods, procedures, and components have not been described in detail so as not to obscure the present one or more embodiments of the disclosure.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the disclosure may for the most part, be implemented using electronic components and circuits known to those skilled in the art, details will not be explained in any greater extent than that considered necessary as illustrated above, for the understanding and appreciation of the underlying concepts of the present one or more embodiments of the disclosure and in order not to obfuscate or distract from the teachings of the present one or more embodiments of the disclosure.

Any reference in the specification to a method may be applied mutatis mutandis to a system capable of executing the method and may be applied mutatis mutandis to a non-transitory computer readable medium that stores instructions that once executed by a computer result in the execution of the method.

Any reference in the specification to a system and any other component may be applied mutatis mutandis to a method that may be executed by a system and may be applied mutatis mutandis to a non-transitory computer readable medium that stores instructions that may be executed by the system.

Any reference in the specification to a non-transitory computer readable medium may be applied mutatis mutandis to a system capable of executing the instructions stored in the non-transitory computer readable medium and may be applied mutatis mutandis to method that may be executed by a computer that reads the instructions stored in the non-transitory computer readable medium.

Any combination of any module or unit listed in any of the figures, any part of the specification and/or any claims may be provided. Especially any combination of any claimed feature may be provided.

In the foregoing specification, the invention has been described with reference to specific examples of embodiments of the invention. It will, however, be evident that various modifications and changes may be made therein without departing from the broader spirit and scope of the invention as set forth in the appended claims.

Those skilled in the art will recognize that the boundaries between logic blocks are merely illustrative and that alternative embodiments may merge logic blocks, circuit elements, or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Any reference to "consisting", "having" and/or "including" may be applied mutatis mutandis to "consisting" and/or "consisting essentially of".

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also, for example, in one embodiment, the illustrated examples may be implemented as a processor or other circuitry located on a single integrated circuit or within a same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination. It will be appreciated by persons skilled in the art that the embodiments of the disclosure are not limited by what has been particularly shown and described hereinabove. Rather, the scope of the embodiments of the disclosure is defined by the appended claims and equivalents thereof.

The invention claimed is:

1. A method for independent response to a query aimed at an artificial intelligence (AI) entity, the method comprising:

querying, by a computerized unit, the AI entity with a computerized unit query that is identical to a reoccurring query that received AI entity responses that change over time from the AI entity;

receiving, by the computerized unit, an AI entity response to the computerized unit query;

buffering the AI entity response in a buffer of the computerized unit and associating timing information with the buffered AI entity response;

receiving, following the buffering, the reoccurring query from a user; and responding to the reoccurring query, wherein the responding comprises:

providing the buffered AI entity response and an indication regarding the timing information;

when receiving from the user, following the provision of the buffered AI entity response, a request to send the reoccurring query to the AI entity then sending an AI entity response generated after the providing of the buffered entity response, to the reoccurring query to the user, and replacing the buffered AI entity response with the AI entity response to the reoccurring query to the user.

2. The method according to claim 1, comprising avoiding caching the AI response.

3. The method according to claim 1, wherein the buffered AI response is an only instance of the AI response within the computerized unit.

4. The method according to claim 1, wherein the buffer is solely dedicated for (i) buffering responses of reoccurring queries that receive AI entity responses that change over time from the AI entity, and (ii) providing buffered responses and related timing information to users.

5. The method according to claim 1, wherein the timing information is indicative of a timing of buffering the buffered AI response.

6. The method according to claim 1, comprising determining, by the computerized unit that a query received by the computerized unit reoccurs and receives AI entity responses that change over time from the AI entity.

7. The method according to claim 1, wherein the AI entity is a large language model (LLM) entity.

8. The method according to claim 1 wherein the responding comprises sending the reoccurring query to the AI entity after receiving the reoccurring query from the user without waiting to receive from the user the request to send the reoccurring query to the AI entity.

9. The method according to claim 1 wherein the responding comprises sending the reoccurring query to the AI entity after receiving the reoccurring query from the user after receiving from the user the request to send the reoccurring query to the AI entity.

10. A non-transitory computer-readable medium for independent response to a query aimed at an artificial intelligence (AI) entity, the non-transitory computer-readable medium storing instructions that, when executed by a computerized unit, cause the computerized unit to:

query the AI entity with a computerized unit query that is identical to a reoccurring query that received AI entity responses that change over time from the AI entity;

receive an AI entity response to the computerized unit query;

buffer the AI entity response in a buffer of the computerized unit and associating timing information with the buffered AI entity response;

receive, following the buffering, the reoccurring query from a user; and respond to the reoccurring query, wherein the respond comprises:

providing the buffered AI entity response and an indication regarding the timing information;

when receiving from the user, following the provision of the buffered AI entity response, a request to send the reoccurring query to the AI entity then sending an AI entity response generated after the providing of the buffered entity response, to the reoccurring query to the user, and replacing the buffered AI entity response with the AI entity response to the reoccurring query to the user.

11. The non-transitory computer-readable medium according to claim 10, wherein the method comprises avoiding caching the AI response.

12. The non-transitory computer-readable medium according to claim 10, wherein the buffered AI response is an only instance of the AI response within the computerized unit.

13. The non-transitory computer-readable medium according to claim 10, wherein the buffer is solely dedicated for (i) buffering responses of reoccurring queries that receive AI entity responses that change over time from the AI entity, and (ii) providing buffered responses and related timing information to users.

14. The non-transitory computer-readable medium according to claim 10, wherein the timing information is indicative of a timing of buffering the buffered AI response.

15. The non-transitory computer-readable medium according to claim 10, wherein the method comprises determining, by the computerized unit that a query received by the computerized unit reoccurs and receives AI entity responses that change over time from the AI entity.

16. The non-transitory computer-readable medium according to claim 10, wherein the AI entity is a large language model (LLM) entity.

17. A computerized unit for independent response to a query aimed at an artificial intelligence (AI) entity, the computerized unit comprising: a controller; and a memory storing instructions that, when executed by the controller, cause the computerized unit to: query the AI entity with a computerized unit query that is identical to a reoccurring query that received AI entity responses that change over time from the AI entity; receive an AI entity response to the computerized unit query; buffer the AI entity response in a buffer of the computerized unit and associating timing information with the buffered AI entity response; receive, following the buffering, the reoccurring query from a user; and respond to the reoccurring query, wherein the respond comprises: providing the buffered AI entity response and an indication regarding the timing information; when receiving from the user, following the provision of the buffered AI entity response, a request to send the reoccurring query to the AI entity then sending an AI entity response generated after the providing of the buffered entity response, to the reoccurring query to the user, and replacing the buffered AI entity response with the AI entity response to the reoccurring query to the user.

18. The computerized unit according to claim 17, wherein the instructions cause the controller to avoid caching the AI response.

19. The computerized unit according to claim 17, wherein the responding comprises sending the reoccurring query to the AI entity after receiving the reoccurring query from the user without waiting to receive from the user the request to send the reoccurring query to the AI entity.

20. The computerized unit according to claim 17, wherein the responding comprises sending the reoccurring query to the AI entity after receiving the reoccurring query from the user after receiving from the user the request to send the reoccurring query to the AI entity.

* * * * *